Patented Oct. 8, 1929

1,730,876

UNITED STATES PATENT OFFICE

WILHELM H. F. BÜHRIG, OF MOUNT VERNON, NEW YORK, ASSIGNOR TO THE FLEISCHMANN COMPANY, OF NEW YORK, N. Y., A CORPORATION OF OHIO

PROCESS FOR THE MANUFACTURE OF YEAST

No Drawing. Application filed May 14, 1925. Serial No. 30,363.

This invention relates to a process of manufacturing yeast especially baker's yeast and more particularly to an improved method of carrying out those processes of manufacturing yeast known as "continuous addition processes," in which at least a portion of the yeast nutrient solution is added during the propagating period.

An object of the invention is to provide an improved procedure for the manufacture of yeast in an efficient, convenient and economical manner whereby the effective capacity of the propagating vats and other propagating apparatus is increased, the efficiency of the assimilation of yeast nutrients raised, and large yields of high quality yeast are obtained.

Other objects of the invention will in part be obvious and will in part appear hereinafter.

The invention accordingly comprises the several steps and the relation and order of one or more of such steps with respect to each of the others thereof, which will be exemplified in the method hereinafter disclosed, and the scope of the application of which will be indicated in the claims.

As a result of the constant endeavors in the art of yeast manufacturing to improve the processes of manufacturing baker's yeast, whereby larger yields may be obtained from cheaper sources of nutrient materials while maintaining or even improving the quality of the yeast produced, there has arisen in the art an ever increasing number of comparatively highly specialized processes. In this evolution the art has gradually tended to swing away from the original types of yeast nutrients solutions which were known as worts and were prepared by rather involved mashing processes entirely from cereal materials, and the so-called "sugar-salt" type of wort has come into use in ever increasing proportions until today a large proportion of baker's yeast is manufactured from nutrient solutions composed either in whole or to a substantial degree of sugar-salt nutrients.

The sugar-salt type of nutrient solutions in general are prepared by pre-treating or clarifying and filtering a relatively cheap source of sugar material such as, for example, molasses to remove therefrom those constituents such as suspended and colloidal matter, coloring matter and the salts of the heavier metals such as calcium, copper, iron and the like, slightly acidifying the treated molasses and adding thereto materials adapted to supply the deficiencies of the sugar material in necessary yeast nutrients, particularly by the addition of materials adapted to supply yeast-assimilable nitrogen and phosphorus. In the more recent types of sugar-salt mashes these added materials are of an inorganic nature such as ammonium compounds, particularly ammonium salts of inorganic acids and aqua-ammonia, and suitable phosphorus-containing compounds such as, for example, phosphoric acid and phosphates, although obviously if desired, organic sources of these materials may be used at least in part in lieu thereof as for example, by the addition of a cereal wort or extracts of cereal materials such as malt sprouts, malt, rye and the like.

In the current practice of yeast manufacture well known advantages of temperature control and aeration are of course, still utilized, the temperature of the propagating liquid being maintained at the usual temperatures of from 25° to 30° C., and the aeration being proportioned in accordance with the size of the propagating vats or fermenters and the stage of the propagating period, in accordance with well known principles, although the tendency of the art is more and more toward increased aeration especially when using the newer types of nutrient solutions. Also in the use of such nutrient solutions particular attention is given to the control of the acidity during the various stages of the propagation, the acid released from the nutrient salts being neutralized from time to time during the process by the addition of suitable neutralizing agents in regulated amounts, and when necessary during the latter stages of the process, the acidity is maintained by the addition of regulated amounts of a suitable acid.

Perhaps the most efficient type of the modern processes has been found to be that which is variously referred to as the "addition", "continuous" or "continuous addition" process in which the propagation is initiated with aeration in water or a dilute portion of the nutrient solution in the fermenter and the remainder of the nutrient solution which has been prepared in a relatively concentrated state is slowly and substantially continuously added thereto from the reserve tank at a rate approximately equal to the attenuation of the propagating liquid by the yeast, such propagation being carried on, particularly in the use of the sugar-salt type of nutrient solutions, with the regulated addition from time to time of additional yeast nutrients such as for example, ammonium phosphate or ammonium sulphate and with the addition of substances adapted to regulate the acidity as afore-mentioned, including those which may also act as yeast nutrients such as for example, aqua-ammonia, ammonium carbonate, sodium bicarbonate, calcium carbonate and the like and sulphuric, phosphoric and lactic acids.

The present invention comprises an improved method of carrying out such continuous addition processes whereby more efficient utilization of the materials and apparatus is obtained. The process is, of course, adapted for use in connection with any of the known types of nutrient solutions and is particularly adapted to the newer sugar-salt types, in the use of which the methods of temperature and acidity control and principles of nutrient addition are carried out in a manner similar to that heretofore used; a principal change in the present process relating to the method of physical manipulation of the nutrient solution.

As pointed out above, in the carrying out of the continuous addition processes according to the heretofore known methods, the nutrient solution is prepared in a relatively concentrated state as for example, from 15° to 20° Balling and placed in a reserve reservoir where it is maintained at a temperature sufficient to prevent infection. The seed yeast is suspended in water or a diluted portion of the nutrient solution, as, for example, about 1.8° Balling, in the fermenter and propagation is initiated with aeration, the addition of the reserve wort or nutrient solution being commenced substantially immedately and the rate of such addition being adjusted in such a manner that the density of the propagating liquid remains approximately constant throughout at least the major portion of the propagating period.

In certain of these processes where the capacity of the fermenter and the size of the mash allows thereof, the liquid is allowed to accumulate in the fermenter until the propagating period is complete whereupon the yeast-containing solution is withdrawn, separated, pressed and packed in the usual manner. In certain other modifications of such processes, however, the liquid is allowed to accumulate in the fermenter only until a substantial mass of liquid is present, whereupon the yeast-containing solution is withdrawn from the bottom of the fermenter and separated at approximately the same rate that the reserve wort is being added thereto, any fluctuation in the mass or density of liquid mass being compensated for by the simultaneous addition to the fermenter either of water or of the "beer" or spent liquid from which the yeast is being separated. This modified type of process is sometimes referred to as the "continuous-addition-withdawal" process and if desired may be carried out in a manner such that the desired mass of liquid and the proportionate amount of seed yeast are initially present in the fermenter, whereupon withdrawal may be commenced immediately.

In view of the relatively pronounced disparity between the density of the inflowing reserve nutrient solution in such continuous-addition processes and that of the finally attentuated solution obtained as beer, it may be that when such processes are modified as described, to the extent that the yeast-containing solution is continuously withdrawn during a portion of the process, the utilization of all yeast nutrients therein available is not completed. Furthermore, since there is a tendency toward increased accumulation of salts in the propagating liquid due to the continued neutralization of the released acidity and to the presence of unassimilated salts which are normally present to a greater or less extent in the reserve nutrient solution, it is apparent that there is an inherent limitation present in such processes which prevents the too long continued use thereof or the handling of larger than the usual sized mashes therein.

It has been found, however, that by the application of the principles of the present invention, the efficiency of such processes and the capacity of the apparatus used may be materially increased. This improved result may be accomplished by in effect interposing into the flow system an additional fermenter, as, for example, adding thereto an auxiliary fermenter into which the partially attenuated nutrient solution is passed from the main fermenter at a period somewhat prior to that heretofore used, the propagating liquid being allowed to accumulate and remain in said auxiliary fermenter until the desired attenuation is reached whereupon the spent yeast-containing liquor may in turn be withdrawn from the bottom of the auxiliary fermenter and separated at approximately the same rate as it is being received from the main fermenter, whereby a continuous operation is attained.

The following is a specific example of the manner in which the present process may be carried out utilizing for purposes of illustration a sugar-salt nutrient solution as the propagating medium:

Any desired quantity of sugar material such as molasses of any suitable type, for example, cane or beet molasses or a mixture thereof, is treated in any suitable manner as above described to clarify the same and adapt it for use in manufacture of yeast whereupon it is pumped to the reserve reservoir and maintained therein at a temperature sufficiently high to prevent infection.

A suitable portion of this prepared solution as for example up to about 15% thereof may be run directly into the fermenter and diluted with the filter wash-waters and/or water until a density of approximately 1° to 2° Balling is obtained. The temperature is simultaneously adjusted to about 25° to 30° C., and the acidity is adjusted to a suitable degree, as, for example about 0.6° (calculated as the number of cc. of normal soda necessary to neutralize 100 cc. of the solution). A short while prior to attaining the final dilution the seed yeast is added to an amount of about 5% or more of the total weight of the molasses used and aeration and addition of the reserve nutrient solution are commenced immediately. The regulation of the acidity and the addition of any extraneous yeast nutrients are carried on in the usual manner but the addition of reserve nutrient solution is accomplished at a rate slightly in excess of the rate of attenuation by the yeast whereby the density of the propagating liquid is gradually built up somewhat in excess of the initial density as for example to about 2.4° to 3.0° Balling at the end of the 6th to the 8th hour.

By this time a suitable quantity of propagating liquid will have accumulated in the main fermenter and withdrawal therefrom into the auxiliary fermenter is commenced at a rate approximately equal to the rate of addition of liquids, including the reserve nutrient solution, to the main fermenter. The liquid thus flowing into the auxiliary fermenter of course carries with it its proportionate yeast content which acts as seed yeast during this second stage of the propagation. It has been found, however, that improved results may be obtained if the resultant loss of yeast from the main fermenter, be in part compensated for by the addition thereto from time to time of additional seed yeast such as, for example, by the addition of about 1.5% added at the 8th hour and 1.5% added at the 16th hour. During this stage of propagation occurring in the auxiliary fermenter, aeration of the propagating liquid and control of the temperature, acidity and yeast nutrient content, is carried on in a manner similar to that in the main fermenter except that by appropriate control of the aeration and by the addition of water and/or beer, the density of the liquid in the auxiliary fermenter is preferably lowered to a density approximately equal to that initially present in the main fermenter, and is there maintained until substantially the end of the process. It is usually unnecessary to neutralize any excess of acidity in the auxiliary fermenter, although it is sometimes desirable to add acid thereto particularly during the latter stages of the propagation.

After the inflowing liquid has been allowed to accumulate in the auxiliary fermenter for a suitable time, as, for example, about 3 hours, withdrawal thereof from the auxiliary fermenter is in turn commenced at a rate substantially equal to the rate of inflow of liquid to the auxiliary fermenter whereby the mass of liquid contained therein is maintained substantially constant. The yeast-containing liquid withdrawn from the auxiliary fermenter is run directly to the separators, the separated yeast being cooled, filtered, pressed and packaged in the usual manner and, if desired, a portion of the beer being returned as a diluent to the main fermenter or to the auxiliary fermenter. When all of the reserve nutrient solution has been added to the main fermenter the flow of liquid is continued until the main fermenter is in turn emptied, and shortly thereafter all of the liquid in the auxiliary fermenter may be separated at an increased rate.

In practicing the above improved procedure it will be apparent that the disparity between the densities of the inflowing and outflowing liquids from both the main and the auxiliary fermenters will be much less than that which would be necessitated in the use of a similar process in which the auxiliary fermenter is omitted from the cycle. As pointed out above, by this means the present invention increases the efficiency of such heretofore known processes and allows of more rapid additions of reserve nutrient solutions to the fermenters whereby larger mashes may be handled in the same time with less apparatus. For example by the use of the present improved process a mash of 15,000 pounds or over of molasses can be passed through two fermenters in a period of about 24 hours, whereas in the heretofore usual practice the capacity limit of 2 fermenters was generally considered to be about 10,000 pounds of molasses. Furthermore, the percentage yield of yeast obtained from the sugar material is increased from 5% to 10% over those heretofore obtained and the keeping qualities, color and baking strength of the yeast are materially improved, for example by the use of the present process typical yields up to from 75% to 85% on the sugar material (based on 50% fermentable sugars) may be obtained.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. In a continuous-addition-withdrawal process of manufacturing yeast in which yeast is propagated with aeration in a main fermenter while a yeast nutrient solution is added thereto slowly and substantially continuously, and yeast-containing solution is withdrawn therefrom at a rate approximately equal to the addition, the improvement which comprises conducting said yeast-containing solution to an auxiliary fermenter, continuing the propagation of the yeast in the yeast-containing liquid in said auxiliary fermenter with aeration for a period of time after it leaves the main fermenter and thereafter withdrawing yeast-containing liquid from the auxiliary fermenter and separating the yeast therefrom.

2. A process of manufacturing yeast, which comprises propagating yeast with aeration in a yeast nutrient solution contained in a fermenter and having a density of about 3° Balling, substantially continuously adding thereto a yeast nutrient solution at a rate such as to maintain the density approximately constant while withdrawing yeast-containing liquid from the fermenter into an auxiliary fermenter at a rate approximately equal to the rate of addition to the first mentioned fermenter, adjusting the density of the yeast-containing liquid in the auxiliary fermenter to about 2° Balling, continuing propagation of yeast in the liquid in the auxiliary fermenter while aerating the same, and thereafter withdrawing the liquid from the auxiliary fermenter and separating the yeast therefrom.

3. A process of manufacturing yeast by propagation, which comprises suspending seed yeast in a non-toxic aqueous liquid in a fermenter, areating the liquid in the fermenter and substantially continuously adding thereto a yeast nutrient solution at a rate in excess of the attenuation by the yeast until a density of about 3° Balling is obtained, thereafter withdrawing the yeast-containing liquid from the fermenter into an auxiliary fermenter at a rate approximately equal to the rate of addition to the main fermenter, aerating the liquid in the auxiliary fermenter and adjusting the density thereof to about 2° Balling, and thereafter separating the yeast from the liquid withdrawn, propagation of yeast occurring in both fermenters during the aeration.

4. A process of manufacturing yeast by propagation, which comprises suspending seed yeast in a non-toxic aqueous liquid in a fermenter, aerating the liquid in the fermenter and substantially continuously adding thereto a yeast nutrient solution at a rate in excess of the attenuation by the yeast until a density of about 3° Balling is obtained, thereafter withdrawing the yeast-containing liquid from the fermenter into an auxiliary fermenter at a rate approximately equal to the rate of addition to the main fermenter, aerating the liquid in the auxiliary fermenter and adjusting the density thereof to about 2° Balling, and after a substantial amount of liquid has accumulated therein, withdrawing yeast-containing liquid therefrom at approximately the same rate as the rate of inflow thereto and separating the yeast from the liquid withdrawn from the auxiliary fermenter, propagation of yeast occurring in both fermenters during the aeration.

5. A process of manufacturing yeast which comprises initiating propagation of yeast with aeration in a dilute nutrient solution in a fermenter, substantially continuously adding thereto a relatively concentrated yeast nutrient solution at a rate somewhat in excess of the attenuation by the yeast, and after a suitable mass of liquid has accumulated therein, withdrawing yeast-containing liquid therefrom into an auxiliary fermenter at a rate substantially equal to the rate of inflow, aerating the liquid in the auxiliary fermenter and adjusting the concentration thereof to approximately that initially present in the main fermenter and after a substantial mass of liquid has accumulated therein, withdrawing yeast-containing liquid therefrom at substantially the rate of inflow thereto, and separating the yeast, propagation of yeast occurring in both fermenters during the aeration.

6. A continuous-addition-withdrawal process of manufacturing yeast which comprises preparing a relatively concentrated yeast nutrient solution, initiating propagation of yeast with aeration in a dilute portion thereof in a fermenter, substantially continuously adding the remainder of the nutrient solution at a rate somewhat in excess of the attenuation by the yeast, until a suitable mass of liquid has accumulated, withdrawing the yeast containing liquid therefrom into an auxiliary fermenter at a rate approximately equal to the rate of inflow, aerating the liquid in the auxiliary fermenter, adjusting the density of the liquid therein to approximately that initially present in the main fermenter and after a substantial mass of liquid has accumulated therein, withdrawing therefrom and separating the yeast-containing liquid at a rate substantially equal to the rate of inflow thereto, propagation of yeast occurring in both fermenters during the aeration.

7. A continuous-addition-withdrawal process of manufacturing baker's yeast which comprises preparing a yeast nutrient solution containing molasses and yeast nutrient inorganic salts, initiating propagation of yeast with aeration in a portion thereof diluted to about 1.8° Balling, adding thereto the remainder of the nutrient solution at a rate such that at about the 8th hour the density is approximately 3° Balling, thereupon withdrawing yeast-containing liquid therefrom into an auxiliary fermenter at approximately the rate of inflow, aerating the liquid in the auxiliary fermenter and adjusting the density thereof to approximately 2° Balling, continuing the propagation for about 3 hours, thereupon withdrawing and separating the yeast-containing liquid from the auxiliary fermenter at a rate substantially equal to the inflow thereto, and during the period of propagation subsequent to the 8th hour maintaining the density of the liquid in the respective fermenters approximately constant by the addition of a diluent when necessary and counteracting the tendency toward increase in acidity in the main fermenter by the addition of aqua-ammonia, propagation of yeast occuring in both fermenters during the aeration.

8. A continuous-addition-withdrawal process of manufacturing baker's yeast which comprises preparing a yeast nutrient solution containing molasses and yeast nutrient inorganic salts, initiating propagation of yeast with aeration in a portion thereof diluted to about 1.8° Balling in a main fermenter, adding thereto the remainder of the nutrient solution at a rate such that at about the 8th hour the density is approximately 3° Balling, thereupon withdrawing yeast-containing liquid therefrom into an auxiliary fermenter at approximately the rate of inflow, aerating the liquid in the auxiliary fermenter and adjusting the density thereof to approximately 2° Balling, continuing propagation for about 3 hours, thereupon withdrawing and separating the yeast-containing liquid from the auxiliary fermenter at a rate substantially equal to the inflow thereto, counteracting the tendency toward increase in acidity in the main fermenter by the addition of aqua-ammonia and maintaining the acidity in the auxiliary fermenter by the addition of acid if necessary, and during the period of propagation subsequent to the 8th hour, maintaining the density of the liquid in the respective fermenters approximately constant by the addition of a diluent if necessary, propagation of yeast occurring in both fermenters during the aeration.

9. A continuous-addition-withdrawal process of manufacturing baker's yeast which comprises preparing a yeast nutrient solution containing molasses and yeast nutrient inorganic salts, initiating propagation of yeast with aeration in a portion thereof diluted to about 1.8° Balling, adding thereto the remainder of the nutrient solution at a rate such that at about the 8th hour the density is approximately 3° Balling, thereupon withdrawing yeast-containing liquid therefrom into an auxiliary fermenter at approximately the rate of inflow, aerating the liquid in the auxiliary fermenter and adjusting the density of the liquid therein to approximately 2° Balling, continuing propagation for about 3 hours, thereupon withdrawing and separating the yeast-containing liquid from the auxiliary fermenter at a rate substantially equal to the inflow thereto, counteracting the tendency toward increase in acidity in the main fermenter by the addition of aqua-ammonia and maintaining the acidity in the auxiliary fermenter by the addition of acid if necessary, and during the period of propagation subsequent to the 8th hour, maintaining the density of the liquid in the respective fermenters approximately constant by the addition of a diluent if necessary, propagation of yeast occurring in both fermenters during the aeration.

In testimony whereof I affix my signature.

WILHELM H. F. BÜHRIG.